United States Patent
Jain

(10) Patent No.: US 9,877,188 B1
(45) Date of Patent: Jan. 23, 2018

(54) WIRELESS NETWORK ACCESS CREDENTIAL SHARING USING A NETWORK BASED CREDENTIAL STORAGE SERVICE

(71) Applicant: Google Inc., Mountain View, CA (US)

(72) Inventor: Arvind Jain, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/458,982

(22) Filed: Aug. 13, 2014

Related U.S. Application Data

(60) Provisional application No. 61/923,440, filed on Jan. 3, 2014.

(51) Int. Cl.
G06F 17/00 (2006.01)
H04W 12/06 (2009.01)
G06F 21/60 (2013.01)

(52) U.S. Cl.
CPC .......... *H04W 12/06* (2013.01); *G06F 21/604* (2013.01)

(58) Field of Classification Search
CPC .............................. H04L 63/20; H04W 12/06
USPC ............................................................ 726/1
See application file for complete search history.

(56) References Cited

U.S. PATENT DOCUMENTS

| | | | |
|---|---|---|---|
| 6,128,490 | A | 10/2000 | Shaheen et al. |
| 6,381,315 | B1 | 4/2002 | Nhaissi |
| 6,633,761 | B1 | 10/2003 | Singhal et al. |
| 7,180,898 | B2 | 2/2007 | Yoshida et al. |
| 7,433,929 | B2 | 10/2008 | Guilford et al. |
| 7,509,131 | B2 | 3/2009 | Krumm et al. |

(Continued)

FOREIGN PATENT DOCUMENTS

| | | |
|---|---|---|
| EP | 1885144 A2 | 2/2008 |
| EP | 2244501 A1 | 10/2010 |

(Continued)

OTHER PUBLICATIONS

Stefan Miltchev et al. ("Decentralized Access Control in Distributed File Systems," ACM Computing Surveys, vol. 40, No. 3, Article 10, Publication date: Aug. 2008, pp. 1-30.*

(Continued)

*Primary Examiner* — Luu Pham
*Assistant Examiner* — Canh Le
(74) *Attorney, Agent, or Firm* — Faegre Baker Daniels LLP

(57) ABSTRACT

A system and method for providing access credentials for a wireless network is provided. The system and method comprises sending a request for access credentials for a wireless network never previously accessed from a requesting client device to a connection helper service hosted by a server. The connection helper service determines a subset of user accounts that have the access credentials for the wireless network stored in an associated remote database. The connection helper service then searches social media to determine whether any of the subset of user accounts are connected with a user account associated with the requesting client device. If there is a connection, then the connection helper service facilitates requesting permission to acquire the access credentials from a remote database associated with a user account for the connection with the access credentials. In this manner, access to the wireless network is provided without manually entering access credentials.

17 Claims, 7 Drawing Sheets

(56) References Cited

U.S. PATENT DOCUMENTS

| | | | |
|---|---|---|---|
| 7,809,360 | B2 | 10/2010 | Agrawal et al. |
| 7,848,292 | B2 | 12/2010 | Bl et al. |
| 8,131,317 | B2 | 3/2012 | Lee |
| 8,155,081 | B1 | 4/2012 | Mater et al. |
| 8,165,581 | B2 | 4/2012 | Joshi et al. |
| 8,200,217 | B2 | 6/2012 | Kanade et al. |
| 8,391,192 | B2 | 5/2013 | Prakash et al. |
| 8,477,645 | B2 | 7/2013 | Scherzer et al. |
| 8,484,568 | B2 | 7/2013 | Rados et al. |
| 8,542,637 | B2 | 9/2013 | Bandhakavi et al. |
| 8,565,766 | B2 | 10/2013 | Scherzer et al. |
| 8,590,023 | B2 | 11/2013 | Gupta et al. |
| 2002/0169716 | A1 | 11/2002 | Johnson et al. |
| 2004/0246920 | A1 | 12/2004 | Savolainen |
| 2005/0245269 | A1 | 11/2005 | Demirhan et al. |
| 2006/0098625 | A1 | 5/2006 | King et al. |
| 2006/0193295 | A1 | 8/2006 | White et al. |
| 2007/0037550 | A1 | 2/2007 | Rassam |
| 2007/0064684 | A1 | 3/2007 | Kottilingal |
| 2007/0064894 | A1 | 3/2007 | Armstrong et al. |
| 2007/0127391 | A1 | 6/2007 | Goodman |
| 2007/0147317 | A1 | 6/2007 | Smith et al. |
| 2008/0002668 | A1 | 1/2008 | Asokan et al. |
| 2008/0009279 | A1 | 1/2008 | Sakawa |
| 2008/0107051 | A1 | 5/2008 | Chen et al. |
| 2008/0233977 | A1 | 9/2008 | Xu et al. |
| 2009/0061862 | A1 | 3/2009 | Alberth, Jr. et al. |
| 2009/0168757 | A1 | 7/2009 | Bush |
| 2009/0298467 | A1 | 12/2009 | Zohar |
| 2010/0172323 | A1 | 7/2010 | Rexhepi et al. |
| 2010/0304737 | A1 | 12/2010 | Jain et al. |
| 2011/0096673 | A1 | 4/2011 | Stevenson et al. |
| 2011/0216694 | A1 | 9/2011 | Plasberg et al. |
| 2011/0269423 | A1 | 11/2011 | Schell et al. |
| 2011/0306318 | A1 | 12/2011 | Rodgers et al. |
| 2012/0052914 | A1 | 3/2012 | Yaqub et al. |
| 2012/0094653 | A1 | 4/2012 | Okuda |
| 2012/0108206 | A1 | 5/2012 | Haggerty |
| 2012/0110640 | A1* | 5/2012 | Donelson ............. H04L 63/102 726/3 |
| 2012/0178488 | A1 | 7/2012 | Jonker et al. |
| 2012/0195223 | A1 | 8/2012 | Raleigh |
| 2012/0282915 | A1 | 11/2012 | Haynes et al. |
| 2013/0148567 | A1 | 6/2013 | Efrati et al. |
| 2013/0155842 | A1 | 6/2013 | Moore et al. |
| 2013/0165117 | A1 | 6/2013 | Narayanan |
| 2013/0203438 | A1 | 8/2013 | Shin |
| 2013/0225169 | A1 | 8/2013 | Farnsworth et al. |
| 2013/0227647 | A1 | 8/2013 | Thomas et al. |
| 2013/0230023 | A1 | 9/2013 | Gray et al. |
| 2013/0303156 | A1 | 11/2013 | Astrom et al. |
| 2014/0071895 | A1 | 3/2014 | Bane et al. |
| 2014/0080539 | A1 | 3/2014 | Scherzer et al. |
| 2014/0127992 | A1 | 5/2014 | Kuscher et al. |
| 2014/0148100 | A1 | 5/2014 | Kim et al. |
| 2014/0148170 | A1 | 5/2014 | Damji et al. |
| 2014/0165165 | A1* | 6/2014 | Story, Jr. ................. H04L 63/08 726/6 |
| 2014/0211648 | A1 | 7/2014 | Rahmati et al. |
| 2014/0213256 | A1 | 7/2014 | Meylan et al. |
| 2015/0098393 | A1 | 4/2015 | Tofighbakhsh et al. |
| 2015/0124791 | A1* | 5/2015 | Mazandarany ..... H04W 76/021 370/338 |
| 2015/0127939 | A1 | 5/2015 | Mazandarany et al. |
| 2015/0141037 | A1 | 5/2015 | Saha et al. |
| 2015/0281198 | A1 | 10/2015 | Lee et al. |
| 2016/0037340 | A1 | 2/2016 | Rayment et al. |
| 2016/0261596 | A1 | 9/2016 | Khello et al. |

FOREIGN PATENT DOCUMENTS

| | | | |
|---|---|---|---|
| WO | 2002-041580 | A1 | 5/2002 |
| WO | 2004-047476 | A1 | 6/2004 |
| WO | 2006-005947 | A1 | 1/2006 |
| WO | 2008/060464 | A2 | 5/2008 |
| WO | 2011-162688 | A1 | 12/2011 |
| WO | WO 2013/020598 | A1 | 2/2013 |
| WO | WO 2013/044359 | A1 | 4/2013 |
| WO | 2014-011094 | A1 | 1/2014 |
| WO | 2015/158263 | A1 | 10/2015 |

OTHER PUBLICATIONS

Daojing He et al. ("Secure Service Provision in Smart Grid Communications," IEEE 2012, pp. 53-61.*

Ge et al., "A History-Based Handover Prediction for LTE Systems" Computer Network and Multimedia Technology. CNMT. International Symposium on , vol., No., pp. 1,4, 18-20 (Jan. 2009).

Gemalto N. V. "Card ADMIN," Document Reference D1225357A (Jun. 2, 2011).

DICODA.com. "Multi IMSI," Dicoda.com (Jun. 20, 2013) (available at: https://web.archive.org/web/20130620191315/http://www.dicoda.com/introduction/imsi).

Higginbotham, Stacey. "Is Apple About to Cut Out the Carriers?" Gigaom.com (Oct. 27, 2010) (available at: http://gigaom.com/2010/10/27/is-apple-about-to-cut-out-the-carriers/).

Tobias, Marc Weber. "The Split Personality Cell Phone That Saves You Money on Overseas Calling," Forbes.com (Aug. 20, 2013) (available at: http://onforb.es/14gMCe4).

"Circuit-switched fallback. The first phase of voice evolution for mobile LTE devices." Qualcomm Incorporated, 2012 11 pages.

CMSG. "Reprogrammable SIMs: Technology, Evolution and Implications," Final Report (Sep. 25, 2012) (available at: http://stakeholders.ofcom.org.uk/binaries/research/telecoms-research/reprogrammable-sims.pdf).

"Feature Requests—Republic Wireless Wiki," http://republic-wireless.wikia.com/wiki/Feature_Requests 1 page.

"Republic Wireless," http://republicwireless.com 2 pages.

"T-Mobile's 4G Network—Check Your Coverage—T-Mobile Blazing Fast 4G Coverage" 9 pages.

"What is VoLTE |Voice Over LTE |Tutorial," *Radio-Electronics.com*, http://www.radio-electronics.com/info/cellulartelecomms/lte-long-term-evolution/voice-over-lte-volte.php 5 pages.

Korean Intellectual Property Office, International Search Report and the Written Opinion in International Application No. PCT/US2014/057709 Dec. 29, 2014.

Bircher et al., "An Agent-Based Architecture for Service Discovery and Negotiation in Wireless Networks," University of Bern, Wired/Wireless Internet Comms. (WWIC), Jan. 21, 2004.

Silverman, Dwight, "Thinking of changing cellphone carriers? Check this app first," http://blog.chron.com/.techblog/2011/06/thinking-of-changing-cellphone-carriers-check-this-app-first/, Houston Chronicle Techblog, Jun. 15, 2011.

VoLGA Forum, "VoLGA Stage 2 V1.7.0: Voice over LTE via Generic Access," Jun. 14, 2010.

Qualcomm Europe et al., "Text Proposal for UE Measurements for Minimizing Drive Tests," 3GPP TSG-RAN WG2 Meeting #66, R2-093175, May 4-8, 2009.

Qualcomm Europe, "Framework for UE SON Reports," 3GPP TSG RAN WG3 & SA WG5, S5-090017, Jan. 12-13, 2008.

CMCC, "Network Selection for WLAN/3GPP Radio Interworking," 3GPP TSG-RAN WG2 Meeting 81#bis, R2-130973, Apr. 15-19, 2013.

Levy, Martyn, "Best-Practice Authentication Methods for Wi-Fi Offload," http://www.acurixnetworks.com/single-post/2013/05/20/BestPractice-Authentication-Methods-For-WiFi-Offload, May 20, 2013.

Ericsson: "RAN-ANDSF Interwor", 3GPP Draft; R2-133440-WLAN 3GPP Radio Interworking—ANDSF Interworking, 3rd Generation Partnership Project (3GPP), Mobile Competence Centre; vol. RAN WG2; Sep. 27, 2013.

Ericsson et al.: "Analysis of WLAN-3GPP interworking solutions", 3GPP Draft; R2-131388—Analysis of WLAN 3GPP Interworking

(56) References Cited

OTHER PUBLICATIONS

Solutions, 3rd Generation Partnership Project (3GPP), Mobile Competence Centre; vol. RAN WG2; Apr. 6, 2013.

* cited by examiner

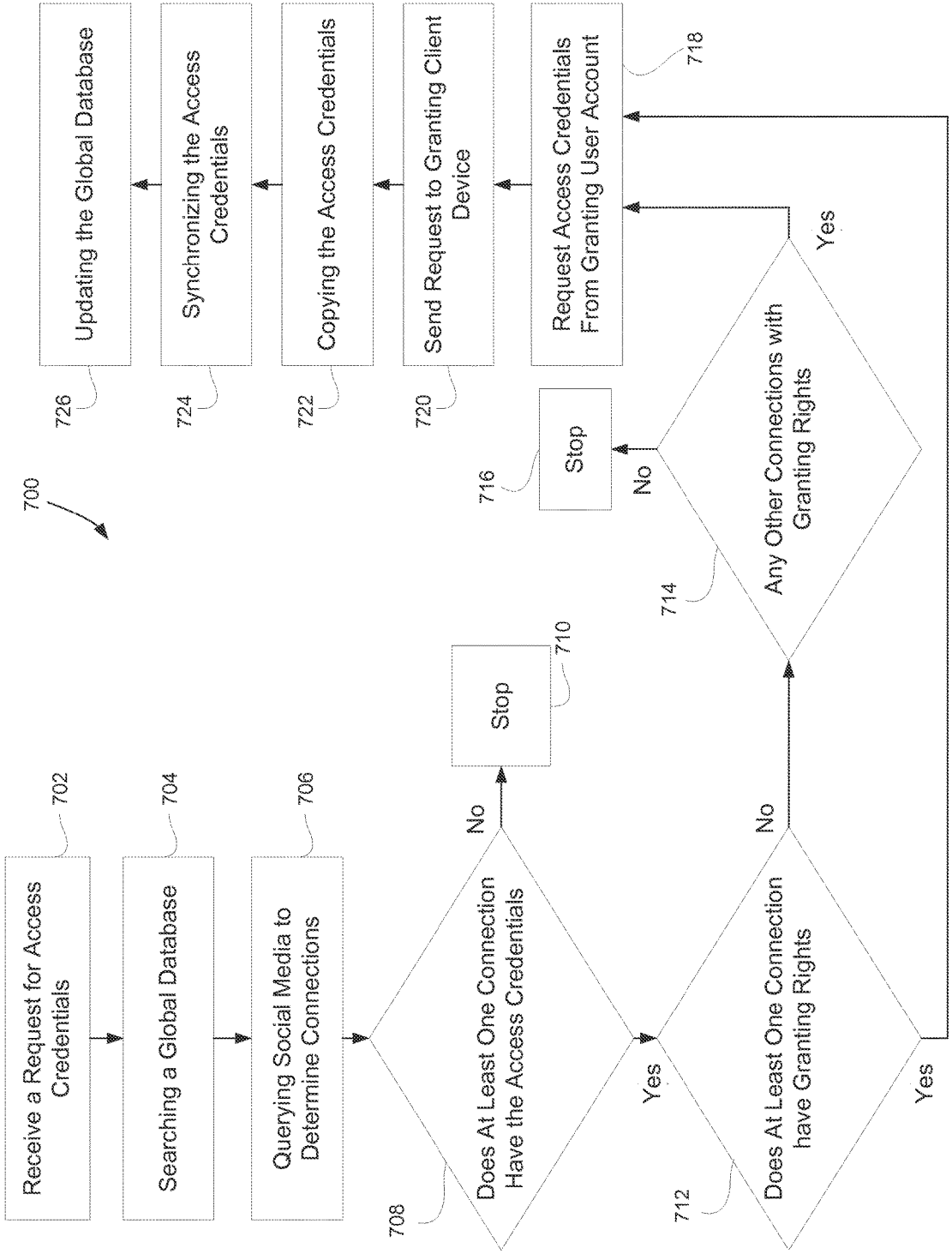

WIRELESS NETWORK ACCESS CREDENTIAL SHARING USING A NETWORK BASED CREDENTIAL STORAGE SERVICE

CROSS-REFERENCE TO RELATED APPLICATION

This patent application claims the benefit of U.S. Provisional Patent Application No. 61/923,440, filed Jan. 3, 2014, which is incorporated herein by reference.

BACKGROUND OF THE INVENTION

A user of a client device such as a smartphone may benefit from using WiFi networks for data access because they are typically less expensive and provide faster service than a typical carrier data network. However, the process of configuring a WiFi network connection on the client device is cumbersome because many WiFi networks are secured networks that require access credentials before the client device can connect. Typically, if a client device has never accessed a particular WiFi network, a user of the client device will be required to manually enter a password or some other access credential into the mobile device prior to an initial use of the WiFi network.

BRIEF SUMMARY OF THE INVENTION

One embodiment provides a method of accessing a wireless network never previously accessed by an individual client device, the individual client device stores access credentials for a plurality of wireless networks it accesses and synchronizes the stored access credentials with a remote database associated with an account of the individual client device, the account is hosted by a server. The method comprising: receiving a request for access credentials for the wireless network never previously accessed by the individual client device at a connection helper service hosted by the server; searching, by the connection helper service, a global database for a subset of accounts that have the access credentials for the wireless network never previously accessed by the individual client device stored in an associated remote database, wherein the global database associates wireless networks and remote accounts that have previously been granted access to the wireless networks; and querying, by the connection helper service, social media to determine whether any of the subset of remote accounts that have access credentials for the wireless network are associated with the account of the individual client device through the social media.

Another embodiment includes a system for providing access credentials for a wireless network. The system comprising: a requesting client device comprising a requesting connection helper client; and a server comprising an account service configured to provide an account for client devices configured to access the server; an access credential storage service configured to provide a remote database for each account provided by the account service, the remote database stores access credentials for wireless networks previously accessed by at least one client device associated with the account; a synchronization service configured to synchronize all access credentials acquired from all client devices associated with the remote account; a connection helper service configured to interact with the connection helper client of the requesting client device; and a global database mapping accounts to wireless networks, the mapping is based on whether the a specific account of the accounts contains access credentials for a specific wireless network of the wireless networks; wherein: the connection helper client is further configured to send a request to the connection helper service, the request is for access credentials for a wireless network never previously accessed by the requesting client device; the connection helper service is further configured to receive the request and search the global database for a subset of accounts that have the access credentials for the wireless network never previously accessed by the requesting client device; and the connection helper service is further configured to query social media to determine whether any of the subset of accounts that have access credentials for the wireless network are associated with an account of the requesting client device through the social media.

Yet another embodiment includes a non-transitory computer readable storage device for providing access to a wireless network never previously accessed by an individual client device, the individual client device stores access credentials for a plurality of wireless networks it accesses and synchronizes the stored access credentials with a remote database associated with an account of the individual client device, the account is hosted by a server. The computer readable storage device having computer executable instructions for performing the steps of: receiving a request for access credentials for the wireless network never previously accessed by the individual client device at a connection helper service hosted by the server; searching, by the connection helper service, a global database for a subset of accounts that have the access credentials for the wireless network never previously accessed by the individual client device stored in an associated remote database, wherein the global database associates wireless networks and remote accounts that have previously been granted access to the wireless networks; and querying, by the connection helper service, social media to determine whether any of the subset of remote accounts that have access credentials for the wireless network are associated with the account of the individual client device through the social media.

BRIEF DESCRIPTION OF THE DRAWINGS

FIG. 7 is a flow diagram for providing access credentials for a wireless network, according to an example embodiment.

DETAILED DESCRIPTION OF THE INVENTION

A user of a client device such as a smartphone may benefit from using WiFi networks for data access because they are typically less expensive and provide faster service than a typical carrier data network. However, the process of configuring a WiFi network connection on the client device is cumbersome because many WiFi networks are secured networks that require access credentials before the client device can connect.

Typically, if a client device has never accessed a particular WiFi network, a user of the client device will be required to manually enter a password or some other access credential into the mobile device prior to an initial use of the WiFi network. After entering the password or other access credential, the client device will store the entered data for future use. However, this storage is typically local and therefore not shared with other devices the particular user may desire to access the WiFi network. Additionally, the password or other access credentials had to be manually entered prior to being joined to the WiFi network.

Figure 1:
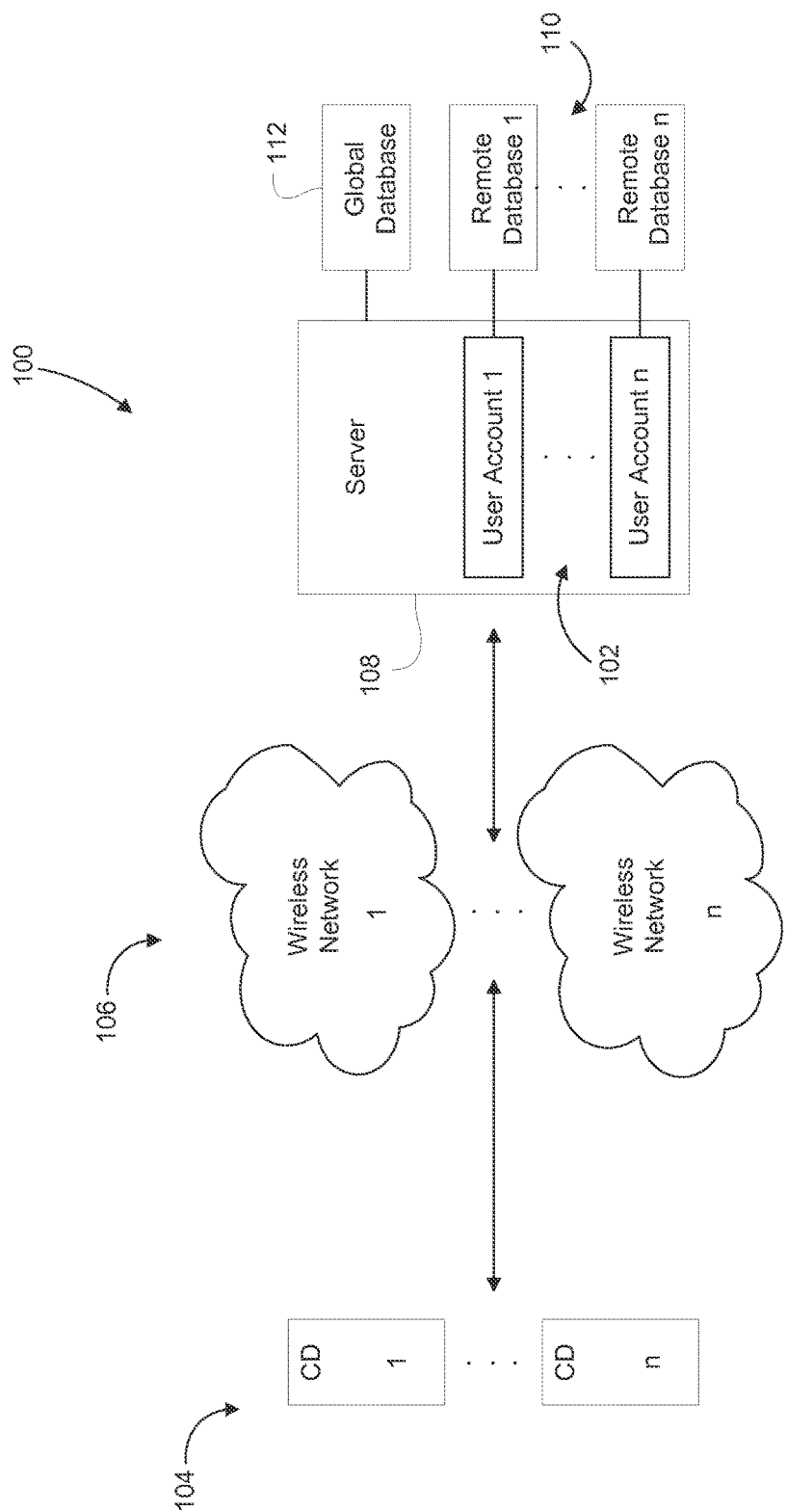
FIG. 1 is a block diagram illustrating a system for providing access credentials for a wireless network, according to an example embodiment.

FIG. 1 illustrates a block diagram of an example communications system 100 in which various embodiments of the present disclosure may be implemented. In the communications system 100 depicted in FIG. 1, a plurality of user accounts 102 are shown along with a plurality of associated client devices 104. The client devices 104 communicate with a server 108 over one or more wireless networks 106.

Server 108 has a plurality of associated remote databases 110. Regarding the plurality of associated remote databases 110, in general, one remote database of the plurality of remote databases 110 is associated with an individual user account of the plurality of user accounts 102. Each remote database is used to store client data such as various passwords and access credentials acquired from the client devices 104 associated with an individual user account.

As each of the plurality of client devices 104 attach to one or more wireless networks 106, the access credentials for the individual wireless network are stored locally at a local wireless network credential store at the client device. A credential storage service at the server 108 synchronizes the access credentials with an associated remote database of the plurality of remote databases 110. As the remote database is synchronized with new access credentials, a synchronization service at the server 108 will synchronize the access credentials with all client devices associated with a user account. In this manner, all client devices associated with an individual user account are synchronized with the same access credentials.

As an aside, in certain embodiments more than one client device may be associated with each user account; however, in other embodiments, only one client device may be associated with a user account and would still be sufficient for the system operation. Additionally, the plurality of client devices 104 may be a mobile device such as a smartphone, a tablet computer, a laptop computer, a watch with a computer operating system, a personal digital assistant (PDA), a video game console, a wearable or embedded digital device(s), or any one of a number of additional devices capable of communicating over the plurality of wireless networks 104.

Additionally, the plurality of wireless networks 106 generally include but are not limited to Wireless Local Area Networks (WLAN) such as the various IEEE 802.11 standards, or any other kind of wireless network. The plurality of wireless networks 106 allow the plurality of client devices 104 to communicate with the server 108.

Server 108 is illustrated as a single server. However, server 108 could be implemented as a plurality of servers, or server 108 could be implemented as a cloud server. The singular server 108 is illustrated for ease of description. This singular server illustration is not intended to limit the disclosure contained herein.

System 100 further includes a global database 112, which the server is configured to host. The server 108 provides a global mapping service that builds a mapping between the plurality of user accounts 102 and the plurality of wireless networks 106 based on whether access credentials for a specific wireless network of the plurality of wireless networks 106 are stored in the associated remote database of the plurality of remote databases 110. The mapping results in a searchable global database 112.

As an aside, the communication system 100 illustrated in FIG. 1 provides one embodiment of the contemplated system architecture. In other embodiments, there may be more than one server, as discussed above, or the various databases, including the global database 112 and the remote databases 110 may be separate, as illustrated, or part of a single database. Further, in some embodiments, the various databases, including the global database 112 and the remote databases 110 may be combined with the server 110 such that the databases are stored in memory associated with the server 110.

Figure 2:
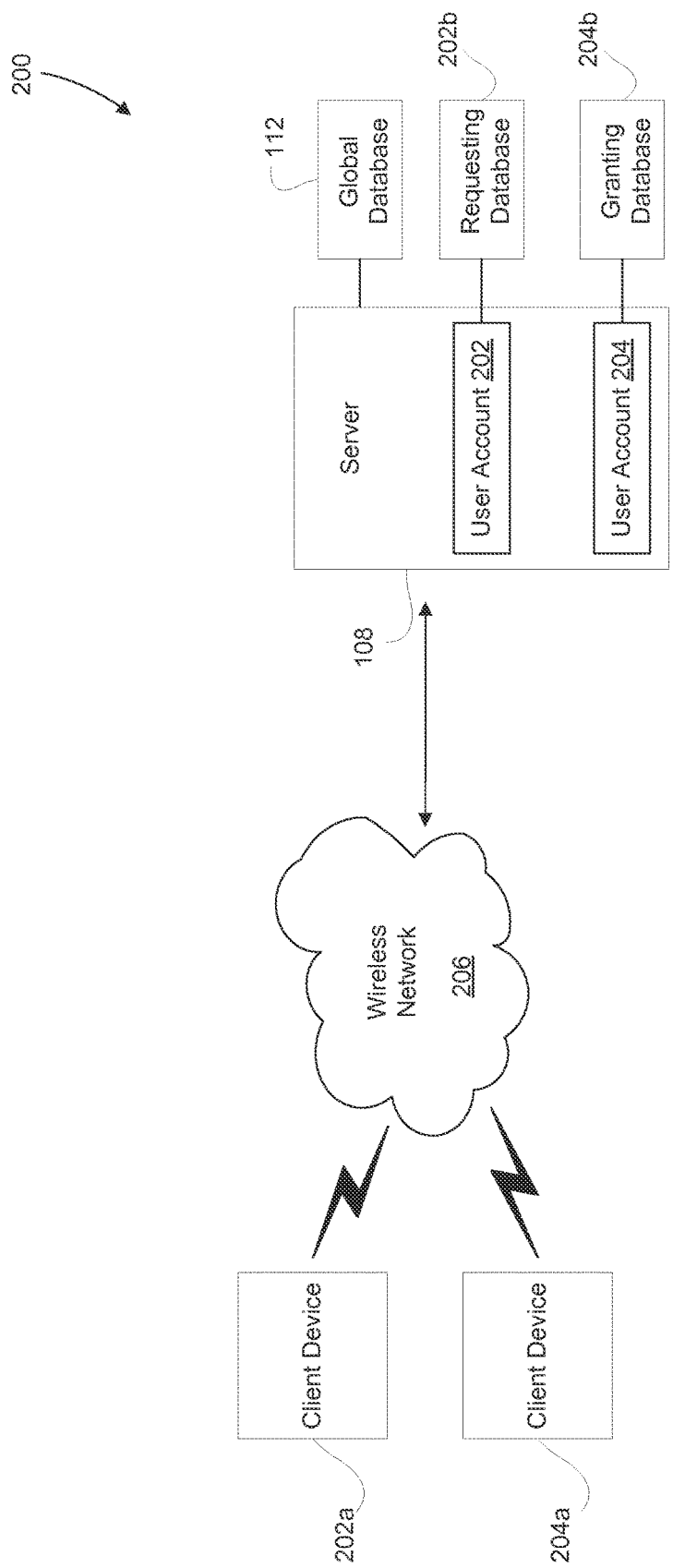
FIG. 2 is a block diagram illustrating an example embodiment of the system of FIG. 1.

Turning now to FIG. 2, a system 200 for providing access credentials is illustrated. FIG. 2 illustrates an embodiment of the system 100 illustrated in FIG. 1. In system 200, two user accounts 202 and 204 are hosted at server 108, and each have an associated individual client device 202a and 204a. Further, each user account 202 and 204 has an associated remote database 202b and 204b.

In system 200, client devices 202a and 204a communicate with the server 108 through wireless network 206. Further, client device 202a is configured as a requesting client device 202a that has never previously been granted access to wireless network 206, which in one embodiment is a WiFi network. Also, client device 204a is configured as a granting client device 204a. Granting client device 204a has previously accessed wireless network 206 and therefore has the associated access credentials stored in a local credential storage at the granting client device 204a. Further, a credential storage service operating at the server 108 has copied the access credentials from the granting client device 204a to the associated remote database 204b, and the global mapping service at the server 108 has mapped the user account 204 as having access to wireless network and stored the mapping at the global database 112.

Global database 112 is a searchable database based on a key for an individual access point for the wireless network 206. The key is any identifier that uniquely identifies the wireless network 206. In the embodiment illustrated in FIG. 2, the wireless network 206 is a WiFi network and the key may be a combination of a Service Set Identifier (SSID) and a Basic Service Set Identifier (BSSID). Accordingly, by searching the global database 112 based on the key a list of a subset of user accounts of the plurality of user accounts 102 (see FIG. 1) associated with client devices, such as granting client device 204a is produced.

Each of the requesting client device 202a and the granting client device 204a include a connection helper client, and the server 108 includes a connection helper service. Based on an interaction between the connection helper clients in client devices 202a and 204a and the connection helper service of the server 108, the requesting client device 202a is able to request and receive access credentials from the granting user account 204.

In one embodiment, the connection helper client of the requesting client device 202a sends a request for access credentials for the wireless network 206 that is received by the connection helper service of the server 108. In one embodiment, the request message is sent automatically when client device 202a detects wireless network 206, while in another embodiment, a user of client device 202a must initiate sending the request message. Whether the client device 202a sends the request automatically or the user must initiate sending, the request contains a key for the wireless network 206. The connection helper service at the server 108 proceeds to search the global database 112 based on the key to determine a subset of user accounts of the plurality of user accounts 102 (see FIG. 1) that have the access credentials for wireless network 206 stored in the remote databases 110 associated with each user account of the subset of user accounts.

Subsequent to determining a subset of user accounts with the access credentials, the connection helper service of the server 108 searches social media connections for the user account 202 associated with the requesting client device 202a to determine whether any of the subset of user accounts are associated with the user account 202 through social media. Searching social media for connections can be done in a variety of ways. One technique in particular would be to search using an Application Protocol Interface (API) developed to determine connections in social media.

As an aside, social media is any media or environment that provides for users to associate with one another and identify a type or classification of connection or connections between the various users of that social media. For instance, one such social media environment would allow users to identify each other based on a relationship status such as friends, family or colleagues in order to provide a network of connections. Other types of social media environments may include an internal list or network of employees within a company.

In the embodiment illustrated in FIG. 2, user account 204 has the requested access credentials of wireless network 206 stored at remote database 204b and the user account 204 is associated with user account 202 through social media. At this point, to maintain security of the wireless network 206, the connection helper service of the server 108 determines whether user account 204 has access granting rights. Access granting rights can be determined in a variety of ways. In one embodiment, access granting rights could be determined by maintaining an amount of time the granting client device 204a spends attached to wireless network 206. If the client device 204a spends a large amount of time on a daily basis attached to wireless network 206, then it would be determined that this user account 204 has granting access rights. The amount of time the granting client device 204a spends attached to the wireless network 206, in certain embodiments, is stored at global database 112.

In another embodiment, granting access rights could be determined by a time based order of the subset of user accounts with access credentials for wireless network 206. For instance, the global database 112 could track when the user account 204 was first given access to wireless network 206. If user account 204 was one of the first user accounts to be given access to wireless network 206, then it would be determined that user account 204 has granting access rights.

In the embodiment illustrated in FIG. 2, the user account 204 has granting access rights. In one embodiment, the connection helper service of server 108 sends a message to the connection helper client of client device 202a to ask the user of client device 202a whether they would like to request access credentials for wireless network 206 from the user of client device 204a. In another embodiment, the request is automatically sent to client device 204a.

Once it is determined that access credentials will be requested from user account 204, the connection helper service of the server 108 sends a request for access to the connection helper client of client device 204a. In one embodiment, the user of client device 204a will be prompted to give access. While in another embodiment, the user may have preconfigured a response such that access is automatically granted once a request is received. In either embodiment, if access is granted, then the connection helper service of the server 108 adds the access credentials for wireless network 206 to the remote database 202b, associated with user account 202, from remote database 204b, associated with user account 204. Once the access credentials are stored in remote database 202b, then the access credentials are synchronized with the local storage at the requesting client device 202a such that access to wireless network 206 is achieved without having to manually enter a password or some other access credential.

In another embodiment, the request for access credentials could be done over a Bluetooth® connection. For instance, in this embodiment, the requesting client device 202a and the granting client device 204a could be located within range of Bluetooth® of the respective devices. In this embodiment, the request could be directly sent from the requesting client device 202a to the granting client device 204a.

Figure 3:
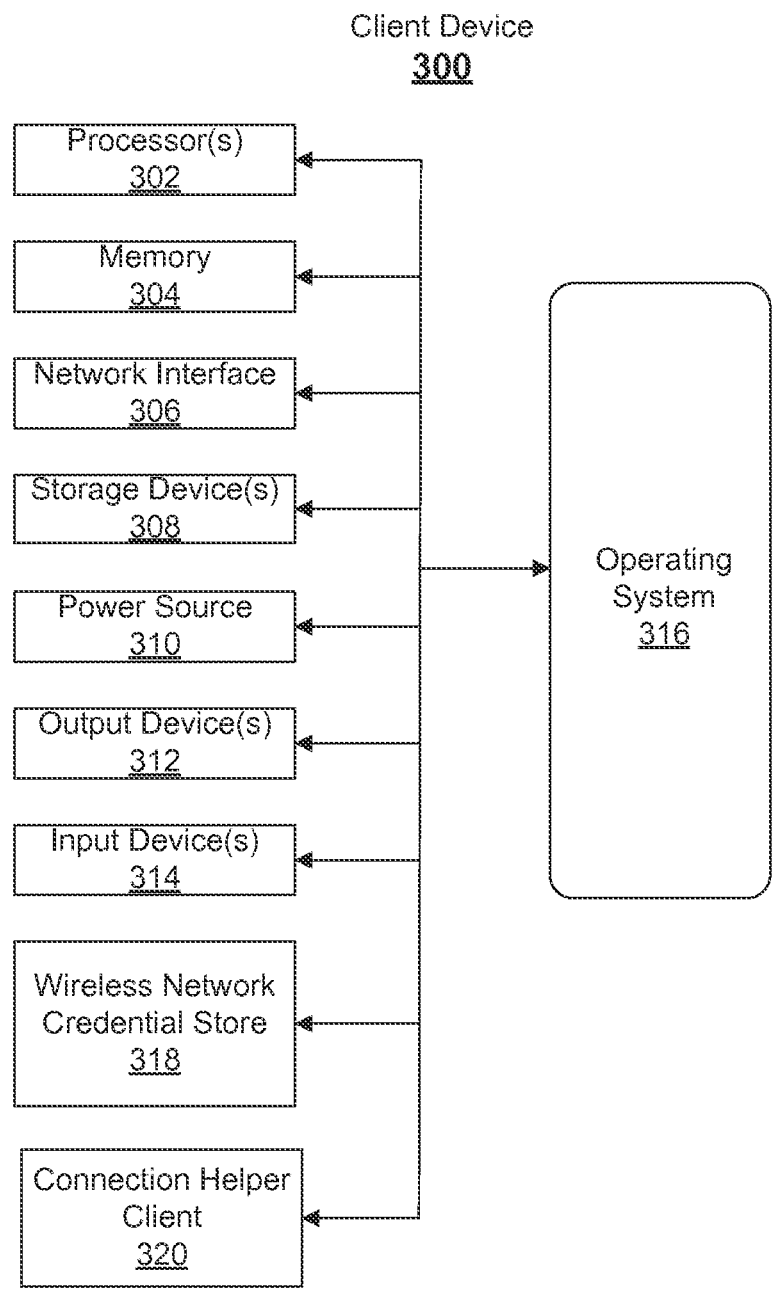
FIG. 3 is a block diagram illustrating components of a client device from the system illustrated in FIG. 1, according to an example embodiment.

Turning now to FIG. 3, a block diagram of basic functional components for an individual client device 300, which is representative of requesting client device 202a and granting client device 204a (see FIG. 2), according to one aspect of the disclosure, is illustrated. In general, many other embodiments of the client device 300 may be used. In the illustrated embodiment of FIG. 3, the client device 300 includes one or more processors 302, memory 304, a network interface 306, one or more storage devices 308, power source 310, one or more output devices 312, one or more input devices 314, a wireless network credential store 318, and a connection helper client 320. The client device 300 also includes an operating system 316. Each of the components including the processor 302, memory 304, network interface 306, storage device 308, power source 310, output device 312, input device 314, operating system 316, wireless network credential store 318, and connection helper client is interconnected physically, communicatively, and/or operatively for inter-component communications.

As illustrated, processor 302 is configured to implement functionality and/or process instructions for execution within client device 300. For example, processor 302 executes instructions stored in memory 304 or instructions stored on a storage device 308. Memory 304, which may be a non-transient, computer-readable storage medium, is configured to store information within client device 300 during operation. In some embodiments, memory 304 includes a temporary memory, an area for information not to be maintained when the client device 300 is turned off. Examples of such temporary memory include volatile memories such as random access memories (RAM), dynamic random access memories (DRAM), and static random access memories (SRAM). Memory 304 also maintains program instructions for execution by the processor 302.

Storage device 308 also includes one or more non-transient computer-readable storage media. The storage device 308 is generally configured to store larger amounts of information than memory 304. The storage device 308 may further be configured for long-term storage of information.

In some examples, the storage device 308 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 300 uses network interface 306 to communicate with external devices via one or more networks, such as the wireless network 206 (see FIG. 2), one or more data networks, and other types of networks through which a communication with the client device 300 may be established. Network interface 306 may be a network interface card, such as an Ethernet card, an optical transceiver, a radio frequency transceiver, or any other type of device that can send and receive information. Other non-limiting examples of network interfaces include Bluetooth®, 3G and WiFi radios in client computing devices, and Universal Serial Bus (USB) devices.

The client device 300 includes one or more input devices 314. Input devices 314 are configured to receive input from a user or a surrounding environment of the user through tactile, audio, and/or video feedback. Non-limiting examples of input device 314 include a presence-sensitive screen, a mouse, a keyboard, a voice responsive system, video camera, microphone or any other type of input device. In some examples, a presence-sensitive screen includes a touch-sensitive screen.

One or more output devices 312 are also included in client device 300. Output devices 312 are configured to provide output to a user using tactile, audio, and/or video stimuli. Output device 312 may include a display screen (part of the presence-sensitive screen), a sound card, a video graphics adapter card, or any other type of device for converting a signal into an appropriate form understandable to humans or machines. Additional examples of output device 312 include a speaker such as headphones, a cathode ray tube (CRT) monitor, a liquid crystal display (LCD), or any other type of device that can generate intelligible output to a user.

The client device 300 includes one or more power sources 310 to provide power to the device. Non-limiting examples of power source 310 include single-use power sources, rechargeable power sources, and/or power sources developed from nickel-cadmium, lithium-ion, or other suitable material.

The client device 300 includes an operating system 316. The operating system 316 controls operations of the components of the client device 300. For example, the operating system 316 facilitates the interaction of the processor(s) 302, memory 304, network interface 306, storage device(s) 308, input device 314, output device 312, and power source 310.

In certain embodiments of the disclosure, the client device 300 further includes a wireless network connection store 318 and a connection helper client 320. In certain embodiments, both the wireless network connection store 318 and the connection helper client 322 represent various states of the processor 302, and are defined by program instructions and/or data stored on the memory 304 or the storage device 308.

The client device 300 uses the wireless network credential store 318 to store access credentials for wireless networks, such as wireless network 206, the client device has previously accessed. This storage is a local storage and therefore could be part of the memory 304 or storage device 308. Further, the wireless network credential store 318 is configured to synchronize with a remote database associated with a user account 202 or 204 for the client device 300, such as remote database 202b or 204b.

The connection helper client 320 interacts with the server 108 in order to facilitate connection of the client device 300 to wireless network 206 or granting access to wireless network 206 depending on whether the client device is acting as a requesting client device 202a (see FIG. 2) or a granting client device 204a. If the connection helper client 320 is associated with the requesting client device 202a, then the connection helper client 320 will send a request for access credentials to server 108. Once the server 108 determines what connections have the requested access credentials, the connection helper client 320 will prompt a user to decide whether to send a request for access to a specific connection. The connection helper client 320 of the granting client device 204a will prompt a user of the client device 204a to either grant or deny access to wireless network 206. Based on the response from the user of the granting client device 204a, the connection helper client 320 will instruct the access credentials to be provided to the requesting client device 202a.

Figure 4:
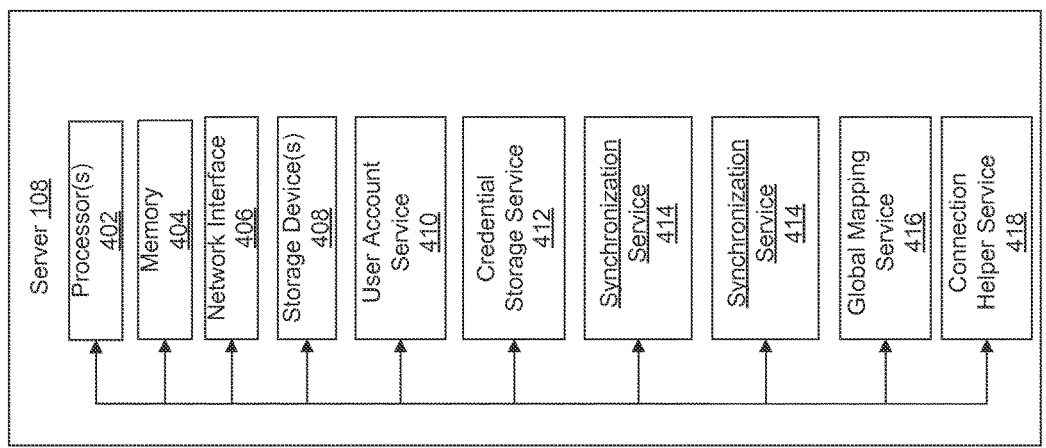
FIG. 4 is a block diagram illustrating components for a server from the system illustrated in FIG. 1, according to an example embodiment.

Moving to FIG. 4, a block diagram of basic functional components for a server 108 (see FIGS. 1 and 2) is depicted, according to one aspect of the disclosure. Specifically, server 108 is configured to facilitate providing access credentials for the plurality of wireless networks 106 to the plurality of client devices 104 (see FIG. 1) and creating a global database 112 mapping user accounts of the plurality of user accounts 102 to wireless networks of the plurality of wireless networks 106 that the user accounts have access credentials for.

The server 108 includes one or more processors 402, memory 404, network interface 406, one or more storage devices 408, a user account service 410, a credential storage service 412, a synchronization service 414, a global mapping service 416, and a connection helper service 418. In some embodiments, each of the components including the processor(s) 402, memory 404, network interface 406, storage device 408, a user account service 410, a credential storage service 412, a synchronization service 414, a global mapping service 416, and a connection helper service 418 are interconnected physically, communicatively, and/or operatively for inter-component communications.

As illustrated, processors 402 are configured to implement functionality and/or process instructions for execution within server 108 (see FIG. 1). For example, processors 402 execute instructions stored in memory 404 or instructions stored on storage devices 408. Memory 404, which may be a non-transient, computer-readable storage medium, is configured to store information within server 108 during operation. In some embodiments, memory 404 includes a temporary memory, i.e. an area for information not to be maintained when the server 108 is turned off. Examples of such temporary memory include volatile memories such as random access memories (RAM), dynamic random access memories (DRAM), and static random access memories (SRAM). Memory 404 also maintains program instructions for execution by the processors 402.

Storage devices 408 also include one or more non-transient computer-readable storage media. Storage devices 408 are generally configured to store larger amounts of information than memory 404. Storage devices 408 may further be configured for long-term storage of information. In some examples, storage devices 408 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 108 uses network interface 406 to communicate with external devices via one or more networks, such as the plurality of wireless networks 106 (see FIG. 1). Such networks may include one or more wireless networks, wired networks, fiber optics networks, and other types of networks through which communication between the server 108 and an external device may be established. Network interface 406 may be a network interface card, such as an Ethernet card, an optical transceiver, a radio frequency transceiver, or any other type of device that can send and receive information.

In certain embodiments of the disclosure, the server 108 further includes the user account service 410, the credential storage service 412, the synchronization service 414, the global mapping service 416, and the connection helper service 418. In certain embodiments, the user account service 410, the credential storage service 412, the synchronization service 414, the global mapping service 416, and the connection helper service 418 represent various states of the processor 402, and are defined by program instructions and/or data stored on the memory 404 or the storage device 408.

The user account service 410 of the server 108 hosts remote user accounts. Each of the plurality of client devices 104 are associated with a specific user account, which is hosted at the server 108 by the user account service 410. Each user account identifies the user of that account and provides access to an associated remote database of the plurality of remote databases 110.

The credential storage service 412 of server 108 synchronizes the access credentials from each wireless network credential store 318 of the client device 300 (see FIG. 2) with an associated remote database 202b or 204b. Because there is one remote database for each user account, the credential storage service 412 will synchronize access credentials from each client device associated with a user account.

The synchronization service 414 of server 108 ensures that the access credentials stored in a remote database are synchronized among all client devices associated with a user account for the remote database. In this regard, the access credentials are pushed to each client device associated with the user account. Therefore, when a user configures a new wireless network manually on one client device, the synchronization service 414 sends the configuration including the access credentials to all of the other client devices associated with the particular user account.

The global mapping service 416 of server 108 builds a mapping between the plurality of user accounts 102 (see FIG. 1) and the plurality of wireless networks 106 based on whether access credentials for a specific wireless network of the plurality of wireless networks 106 are stored in the associated remote database of the plurality of remote databases 110. The mapping results in a global database 112 searchable based on a key for a specific wireless network, as discussed above.

The connection helper service 418 of server 108 interacts with client devices 202a and 204a in order to facilitate a connection to wireless network 206 (see FIG. 2). The connection helper service 418 receives a request for access credentials from the connection helper client 320 of a requesting client device 202a. The connection helper service 418 will search the global database 112 (see FIG. 1) based on a received key for a wireless network specified in the request. The connection helper service 418 determines a subset of user accounts that have associated remote databases that have the desired access credentials stored. The connection helper service 418 then searches social media associated with the user account 202 (see FIG. 2) of the requesting client device 202a to determine whether at least one user account of the subset of user accounts that have access to the wireless network 206 is connected to the user account 202 through social media. If at least one user account is connected to the user account 202, such as user account 204, then the connection helper service 418 sends a message to the connection helper client 320 of the requesting client device 202a asking whether a request should be sent to the user associated with the at least one user account with access.

Based on a response from the connection helper client 320 of the requesting client device 202a, the connection helper service 418 will send a request for granting access to the connection helper client 320 of the granting client device 204a. If access is granted, then the connection helper service 418 will copy the access credentials from the remote database 204b to the remote database 202b. At this point, the credential storage service 412 synchronizes copied access credentials to all client devices associated with the user account 202, such as requesting client device 202a.

Figure 5:
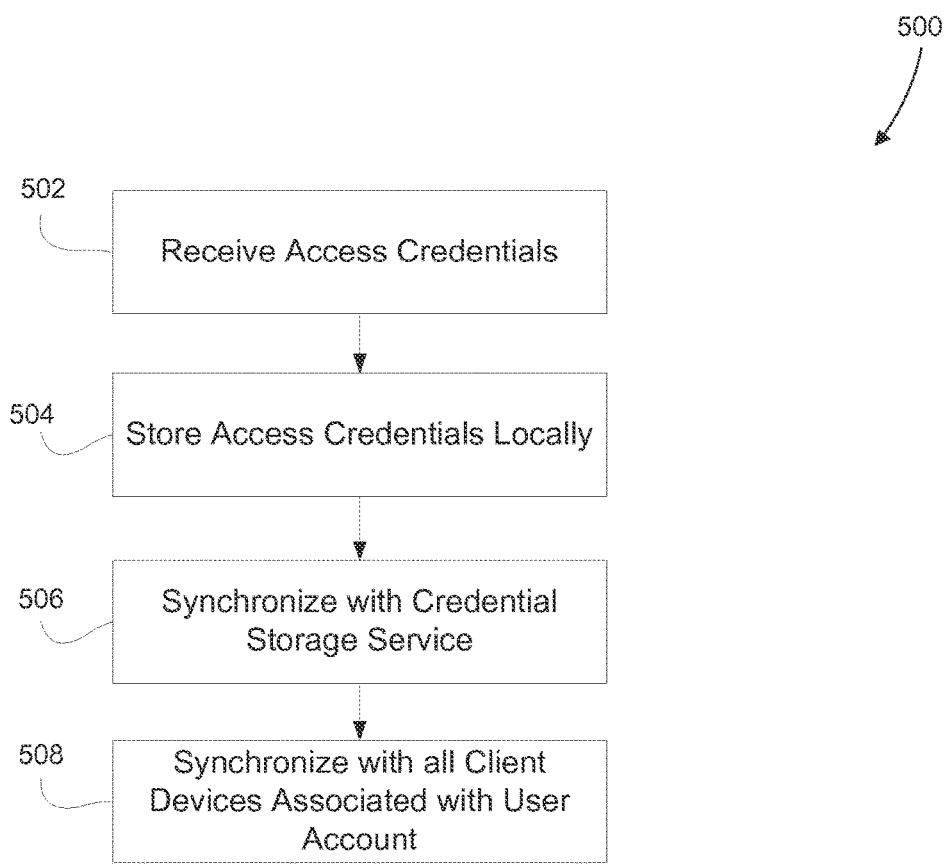
FIG. 5 is a flow diagram for providing an access credential storage service associated with an individual user account, according to an example embodiment.
Figure 6:
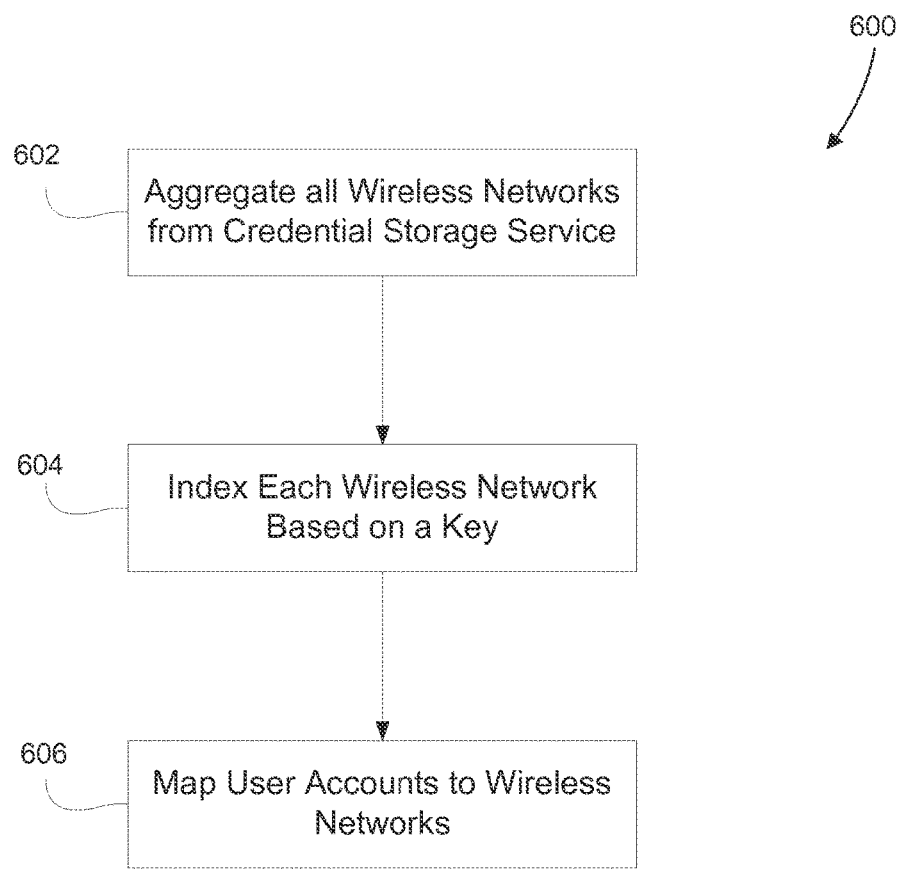
FIG. 6 is a flow diagram for building a global database mapping between wireless networks and user accounts that have access credentials stored for particular wireless network, according to an example embodiment.

FIGS. 5-7 illustrate flow diagrams detailing various embodiments of the method and system for providing access credentials for a wireless network. FIG. 5 illustrates a flow diagram 500 for synchronizing access credentials with all client devices associated with a particular user account. At step 502, a client device receives access credentials for a wireless network never previously accessed. At step 504, the client device stores the access credentials location at a wireless network credential store 318. At step 506, the credential storage service 412 of server 108 synchronizes the recently acquired access credentials with a remote database associated with a user account for the client device. At step 508, the synchronization service 414 synchronizes the recently acquired access credentials with the wireless network store 318 of each client device associated with the user account.

FIG. 6 illustrates flow chart 600 for building global database 112 (see FIG. 1). At step 602, the global mapping service 416 (see FIG. 4) aggregates the plurality of wireless networks 106 (see FIG. 1). At step 604, the global mapping service 416 indexes each individual wireless network of the plurality of wireless networks 106 with a key that uniquely identifies the individual wireless network. At step 606, the global mapping service 416 creates a mapping of all user accounts that have access credentials for each wireless network stored in an associated remote database.

FIG. 7 illustrates flow chart 700 for providing access credentials for a wireless network. At step 702, the connection helper service 418 of the service 108 receives a request for access credentials for a wireless network. At step 704, the connection helper service 418 searches the global database based on a key for the wireless network to determine a subset of user accounts with access credentials for the wireless network. At step 706, the connection helper service 418 queries social media to determine connections for a user account associated with the request for access credentials. At step 708, the connection helper client checks whether at least one social media connections are part of the subset of user accounts with access credentials. If there is not overlap between the two groups then the request is terminated at step 710. If there is overlap, then at step 712, the connection helper service 418 checks whether the at least one connection has granting rights. If the at least one connection does not have granting rights, then connection helper service 418 proceeds to check if further connections with access credentials have granting rights at step 714. If no connections with access credentials have granting rights, then the request is terminated at step 716.

However, if any connection with access credentials is determined to have granting rights, then, at step 718, the connection helper service 418 requests the access credentials from a user account associated with the connection. At step 720, a request for access credentials is sent to a client device associated with the user account associated with the connection with the access credentials. If access is granted, then, at step 722, the connection helper service 418 copies the access credentials from a remote database associated with the user account associate with the connection with the access credentials to a remote database associated the user account associated with the request for access credentials. At step 724, the synchronization service 414 synchronizes the access credentials with all client devices associated with the user account associated with the request for access credentials. And at step 726, the global mapping service 416 updates the mapping contained in the global database 112 (see FIG. 1).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a server.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of accessing a wireless network previously not accessed by an individual client device, the method comprising:

receiving, at a connection helper service of a server, a request for access credentials for the wireless network previously not accessed by the individual client device, wherein the individual client device stores access credentials for a plurality of wireless networks that the individual client device accesses and synchronizes the stored access credentials for the plurality of wireless networks with a remote database that is associated with a user account of the individual client device;

in response to receiving the request for the access credentials for the wireless network previously not accessed by the individual client device, searching, by the connection helper service, a global database to determine a subset of user accounts, wherein the subset of user accounts have the access credentials for the wireless network previously not accessed by the individual client device, wherein the access credentials in the subset of user accounts have not been shared with the user account of the individual client device, and wherein the global database associates wireless networks and user accounts that have previously been granted access to the wireless networks;

after the request for the access credentials for the wireless network previously not accessed by the individual client device is received and after searching the global database, querying, by the connection helper service, social network connections and determining whether any of the determined subset of user accounts from the global database is associated with the user account of the individual client device through the social network connections;

sharing, by the connection helper service, the access credentials in the subset of user accounts with the user account of the individual client device based on the determination of whether any of the determined subset of user accounts from the global database is associated with the user account of the individual client device; and in response to determining at least one user account of the subset of user accounts from the global database is associated with the user account of the individual client device based on the querying of the social network connections, requesting, by the connection helper service, the access credentials for the wireless network previously not accessed by the individual client device from the at least one user account.

2. The method of claim 1, further comprising:
sending, by the connection helper service, a request message to a client device associated with the at least one user account; and
receiving, by the connection helper service, permission to acquire the access credentials for the wireless network previously not accessed by the individual client device from the client device associated with the at least one user account.

3. The method of claim 2, further comprising copying the access credentials for the wireless network previously not accessed by the individual client device to the remote database associated with the user account of the individual client device.

4. The method of claim 3, further comprising updating the global database such that the user account of the individual client device is associated with the wireless network previously not accessed by the individual client device.

5. The method of claim 2, wherein the client device associated with the at least one user account has been given access granting rights for the wireless network previously not accessed by the individual client device.

6. The method of claim 5, wherein the access granting rights are based on a ranked order of the subset of user accounts.

7. The method of claim 5, wherein the access granting rights are based on an amount of time the client device associated with the at least user one account spends attached to the wireless network previously not accessed by the individual client device.

8. The method of claim 1, wherein requesting the access credentials for the wireless network previously not accessed by the individual client device comprises prompting the individual client device to decide whether to send a request message to a client device associated with the at least one user account.

9. An apparatus for providing access credentials for a wireless network, the apparatus comprising:
a processor device configured to:
provide an account for each client device configured to access the apparatus;
provide a remote database for each account provided by the account service, wherein the remote database for each account stores access credentials for wireless networks previously accessed by at least one client device associated with each account;
synchronize all access credentials acquired from all client devices associated with each account;
interact with a requesting connection helper client of a requesting client device; and
a global database coupled to the processor device that maps accounts to wireless networks, wherein the mapping is based on whether a specific account of the accounts in the global database contains access credentials for a specific wireless network of the wireless networks;
wherein:
the processor device is further configured to receive a request from the connection helper client of the requesting client device, wherein the request is for access credentials for a wireless network previously not accessed by the requesting client device;
in response to receiving the request, the processor device is further configured to search the global database to determine a subset of the accounts, wherein the subset of the accounts have the access credentials for the wireless network previously not accessed by the requesting client device, wherein the access credentials in the subset of the accounts have not been shared with an account of the requesting client device;
after the request is received and after searching the global database, the processor device is further configured to query social network connections and determine whether any of the determined subset of the accounts from the global database is associated with the account of the requesting client device through the social network connections, and share the access credentials in the subset of the accounts with the account of the requesting client device based on the determination of whether any of the determined subset of the accounts from the global database is associated with the account of the requesting client device; and
in response to determining at least one account of the subset of the accounts from the global database is associated with the account of the requesting client device based on the querying of the social network connections, the processor device is further configured to send another request to the at least one account for the access credentials for the wireless network previously not accessed by the requesting client device.

10. The apparatus of claim 9, further comprising a granting client device associated with the at least one account, the granting client device comprises a granting connection helper client configured to:
receive the another request from the connection helper service; and
grant the another request.

11. The apparatus of claim 10, wherein the processor device is further configured to copy the access credentials for the wireless network previously not accessed by the requesting client device from a remote database associated with the granting client device to a remote database associated with the account of the requesting client device.

12. The apparatus of claim 11, wherein the processor device is further configured to update the global database such that the account of the requesting client device is associated with the wireless network previously not accessed by the requesting client device.

13. The apparatus of claim 9, wherein the apparatus is a cloud server.

14. A non-transitory computer readable storage device for providing access to a wireless network previously not accessed by an individual client device, the computer readable storage device having computer executable instructions for performing the steps of:
receiving, at a connection helper service of a server, a request for access credentials for the wireless network previously not accessed by the individual client device, wherein the individual client device stores access credentials for a plurality of wireless networks that the individual client device accesses and synchronizes the stored access credentials for the plurality of wireless networks with a remote database that is associated with a user account of the individual client device;
in response to receiving the request for the access credentials for the wireless network previously not accessed by the individual client device, searching, by the connection helper service, a global database to determiner a subset of user accounts, wherein the subset of user accounts have the access credentials for the wireless network previously not accessed by the individual client device, wherein the access credentials in the subset of user accounts have not been shared with the user account of the individual client device, and wherein the global database associates wireless networks and user accounts that have previously been granted access to the wireless networks;

after the request for the access credentials for the wireless network previously not accessed by the individual client device is received and after searching the global database, querying, by the connection helper service, social network connections and determining whether any of the determined subset of user accounts from the global database is associated with the user account of the individual client device through the social network connections;

sharing, by the connection helper service, the access credentials in the subset of user accounts with the user account of the individual client device based on the determination of whether any of the determined subset of user accounts from the global database is associated with the user account of the individual client device; and in response to determining at least one user account of the subset of user accounts from the global database is associated with the user account of the individual client device based on the querying of the social network connections, requesting, by the connection helper service, the access credentials for the wireless network previously not accessed by the individual client device from the at least one user account.

15. The non-transitory computer readable storage device of claim 14, further comprising instructions for performing the steps of:

sending, by the connection helper service, a request message to a client device associated with the at least one user account; and receiving, by the connection helper service, permission to acquire the access credentials for the wireless network previously not accessed by the individual client device from the client device associated with the at least one user account.

16. The non-transitory computer readable storage device of claim 15, further comprising instructions for performing the steps of copying the access credentials for the wireless network previously not accessed by the individual client device to the remote database associated with the user account of the individual client device.

17. A method of accessing a wireless network previously not accessed by an individual client device, the method comprising:

receiving, at a server, a request for access credentials for the wireless network previously not accessed by the individual client device;

in response to receiving the request, searching, by the server, a global database to determine a subset of user accounts, wherein the subset of user accounts have the access credentials for the wireless network previously not accessed by the individual client device, wherein the access credentials in the subset of user accounts have not been shared with a user account of the individual client device;

after the request is received and after searching the global database, querying, by the server, social network connections and determining whether any of the determined subset of user accounts from the global database is associated with the user account of the individual client device through the social network connections;

in response to determining at least one user account of the determined subset of user accounts from the global database is associated with the user account of the individual client device, determining, by the server, whether the at least one user account has access granting rights for the wireless network previously not accessed by the individual client device;

in response to determining the at least one user account has the access granting rights, requesting, by the server, the access credentials for the wireless network previously not accessed by the individual client device from the at least one user account;

synchronizing, by the server, the access credentials for the wireless network previously not accessed by the individual client device from the at least one user account with the individual client device; and updating, by the server, the global database to have the user account of the individual client device be associated with the wireless network previously not accessed by the individual client device.

* * * * *